INVENTORS
WALTER MEYER
RICHARD S. OLSEN

BY *Stowell & Stowell*

ATTORNEYS

Jan. 17, 1967 W. MEYER ETAL 3,298,791
ION-EXCHANGE RESIN COUNTER-CURRENT EXTRACTION APPARATUS
Filed July 22, 1963 2 Sheets-Sheet 2

INVENTORS
WALTER MEYER
RICHARD S. OLSEN
BY Stowell & Stowell
ATTORNEYS

United States Patent Office 3,298,791
Patented Jan. 17, 1967

3,298,791
ION-EXCHANGE RESIN COUNTER-CURRENT EXTRACTION APPARATUS
Walter Meyer and Richard S. Olsen, Corvallis, Oreg., assignors to Research Corporation, New York, N.Y., a corporation of New York
Filed July 22, 1963, Ser. No. 296,820
3 Claims. (Cl. 23—270)

This invention relates to apparatus for effecting continuous countercurrent contact of a liquid with a particulate solid and particularly for apparatus adapted for continuous countercurrent contact of ion exchange composition with liquids.

In its most general form, the apparatus of the invention comprises a generally upright cylindrical vessel having in the upper portion thereof a perforate member permeable to liquid but not to a particulate solid to be contacted with the liquid, an aperture for the supply of particulate solid to the upper portion of the vessel below the perforate member, check valve means permitting flow through the aperture only into the vessel, conduit means for the flow of liquid from the vessel above the perforate member, conduit means for the flow of particulate solid from the lower portion of the vessel, conduit means for the supply of liquid to the vessel intermediate the upper and lower portions thereof, and means for applying pulses to the liquid in the vessel whereby on the positive stroke of each pulse, a portion of liquid is caused to flow from the upper portion of the vessel through the perforate member and a portion of particulate solid suspended in liquid is caused to flow from the lower portion of the vessel and on the negative stroke of each pulse, particulate solid is caused to flow into the upper portion of the vessel through said aperture.

Various modifications of the apparatus may be provided. For example, conduits for the supply and removal of a wash or extractant liquid may be provided in the lower portion of the vessel below the supply inlet for liquid to be contacted with the particulate solid. Extractant liquid may be contacted with solid subsequent to contact of the solid with liquid to be treated, either in a lower continuation of the vessel or in a separate vessel of similar construction and operation.

Illustrative forms of the apparatus of the invention are shown in the accompanying drawings in which.

Figure 1:
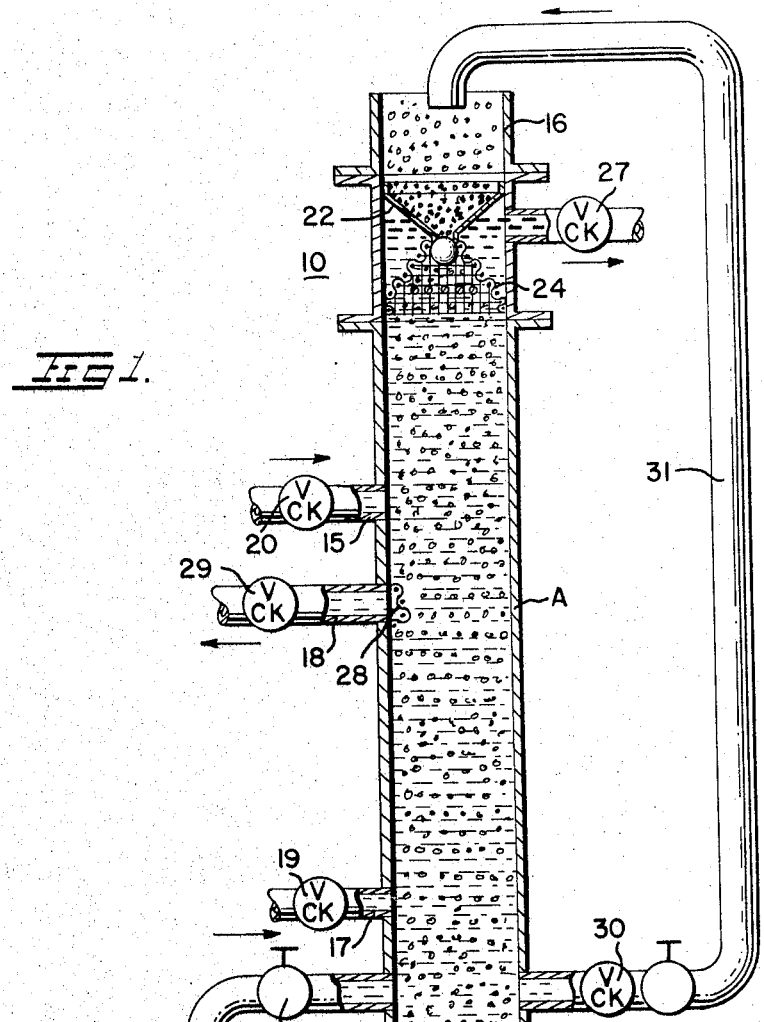
FIG. 1 is a diagrammatic representation in partial section of one form of the apparatus of the invention.
Figure 2:
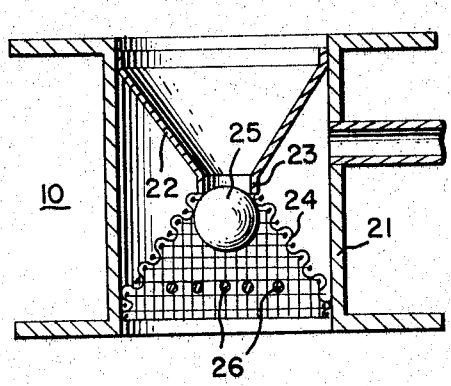
FIG. 2 is a vertical section of a valve construction suitable for the supply of particulate material into the contact apparatus only on the negative stroke of the pulsing means associated with the apparatus.

Referring more particularly to FIGS. 1 and 2, A is a cylindrical vessel having a particulate solid inlet valve 10 in the upper portion and a pulsing device 11 in the lower portion thereof.

The pulsing device 11 is shown as a flexible membrance 13 actuaed by crank member 14 driven by motor means not shown. A piston reciprocating in a cylinder communicating with vessel A or other suitable pulsing device may be used instead of the device shown.

Liquid to be contacted with particulate solid, for example, a solution containing values to be extracted by an ion exchange resin, is supplied to vessel at 15 and the particulate solid, typically ion exchange resin, is supplied into the hopper section 16 of the apparatus.

A regenerating solution may be supplied to the vessel at 17 and removed at 18.

During the negative stroke of the pulser solution to be extracted is drawn into the vessel at 15 and wash or regenerating liquid is drawn into vessel at 17 through suitable check vales 20, 19, respectively, and the particulate solid is drawn into the upper portion of the vessel, through the solid inlet valve 10.

The inlet valve 10, as more particularly shown in FIG. 2, consists of a body section 21 carrying an imperforate conical septum 22 sloping downwardly to an aperture 23 and a perforate conical septum 24 sloping upwardly to the aperture 23. Housed in the perforate conical section is a hollow ball 25 which seats against aperture 23. An optional grid member 26 keeps the ball from dropping out of the valve body when the apparatus is emptied.

During the positive stroke of the pulser, the ball 25 closes aperture 23 and liquid which has contacted the solid material in the vessel flows through perforate septum 24 and check valve 27 out of the vessel. At the same time, wash liquid flows out of the vessel through screen 28 and check valve 29, while a suspension of the particulate solid flows out of the vessel through check valve 30 and conduit 31 to hopper section 16.

The vessel may be emptied of its contents through draw-off valve 32.

Figure 3:
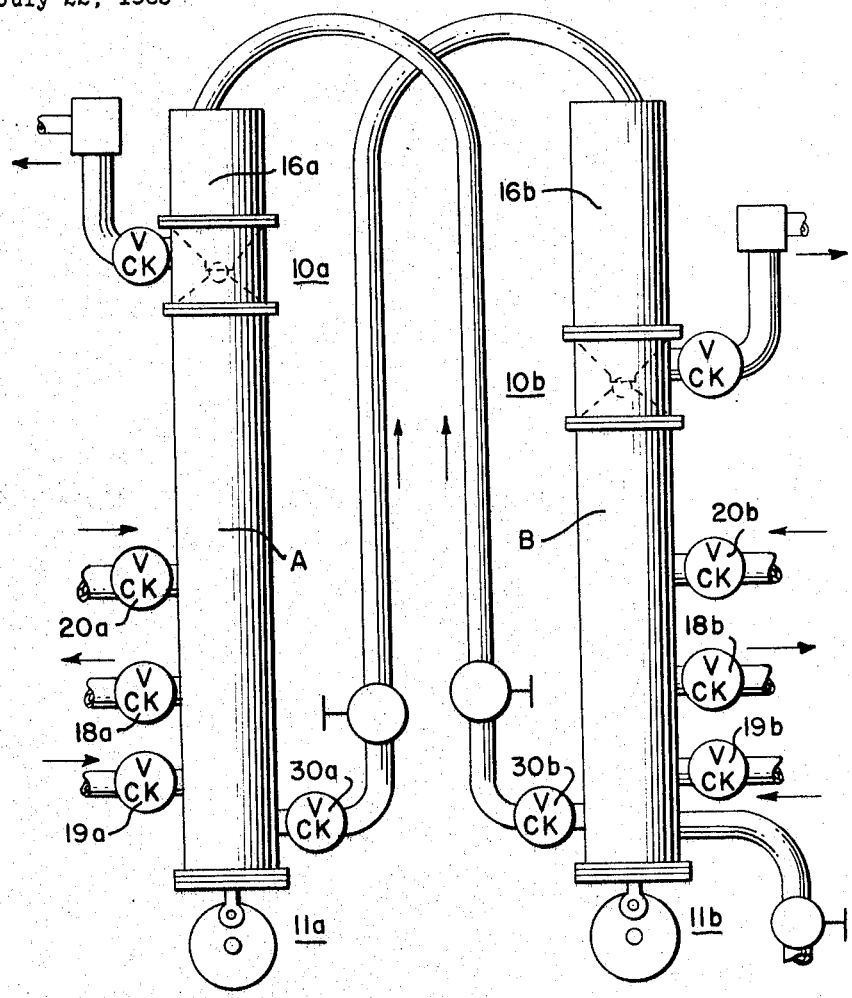
FIG. 3 is a diagrammatic representation of apparatus embodying successive contact of a plurality of liquids with a particulate solid in separate interconnected vessels.

In the apparatus shown in FIG. 3, in which like elements are designated by the same reference numerals as are used in FIG. 1, the washed solids leaving vessel A in suspension are transferred to the supply hopper 16b of vessel B in which they are treated for regeneration or the like and the washed solids from vessel B are returned to the supply hopper 16a of vessel A.

Figure 4:
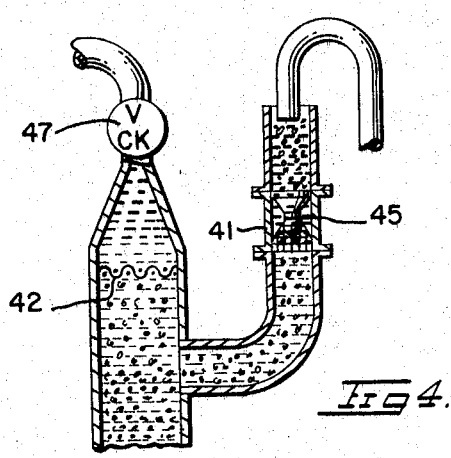
FIG. 4 is a diagrammatic representation in partial section of a modified arrangement for the supply of particulate material into the apparatus.

In the alternative form of valve shown in FIG. 4, the perforate septum 42 for the outflow of treated liquid is separated from the solids supply valve body 41 containing an imperforate conical septum leading up to a central aperture providing a seat for hollow ball 45.

Instead of check valves in the liquid inlet and outlet lines as illustrated, valves actuated for opening and closure in synchronism with the negative and positive strokes of the pulsing means may be used.

The following experimental data are illustrative of the principles of the invention. The data were obtained with a pair of cylindrical columns three inches in diameter connected substantially as shown in FIG. 3. 20–50 mesh Dowex 50W–X8 ion exchange resin was used to extract copper from a 0.485 N cupric sulfate solution in column A and the copper was removed from the resin and the resin regenerated by contact with 1.50 N sodium sulfate solution in column B. The contact zone in column A was three feet in length and in column B four feet in length. The water rinse zone in each column was one foot in length with a one foot separation between the rinse liquid outlets and the feed inlets of the exchange zones.

The rate of resin feed was 2.3 ml./cm.$^2$/min. The cupric sulfate feed was 9.9 ml./cm$^2$/min. and the sodium sulfate feed was 3.2 ml./cm$^2$/min. The columns were pulsed substantially sinusoidally at a pulse rate of about eleven pulses per minute and a pulse volume of about 81 ml.

The solute in the effluent from the top of column A was 2.5% cupric sulfate and 97.5% sodium sulfate and the solute in the effluent from the top of column B was 85% cupric sulfate and 15% sodium sulfate.

We claim:

1. Apparatus for continuous countercurrent contact of liquid with a particulate solid comprising a generally upright cylindrical vessel, outlet means for the flow of liquid from the upper portion of said vessel including a perforate member permeable to liquid but not to the particulate solid and including valve means permitting only flow out of the vessel, inlet means for supplying particulate solid to the upper portion of said vessel including an aperture and check valve means permitting flow through said aperture only into the vessel, outlet means for the flow of particulate solid from the lower portion of said vessel including valve means permitting only flow out of the vessel, inlet means for the supply of liquid to said vessel below said perforate member including valve means permitting only flow into the vessel and means for applying pulses to the liquid in said vessel to cause on the positve stroke of each pulse particulate solid material to flow from the lower portion of the vessel to said inlet means for supplying particulate solid and on the negative stroke of each pulse to cause particulate solid material to flow into the upper portion of the vessel through said aperture.

2. Apparatus as defined in claim 1 including at least one further outlet means for the flow of liquid from the vessel below said inlet means and at least one further inlet means for the supply of liquid to said vessel below said further outlet means.

3. Apparatus for continuous countercurrent contact of liquid with a particulate solid including two generally upright cylindrical vessels each having inlet, outlet and pulsing means as defined in claim 1 and conduit means transferring particulate solid suspended in liquid from the outlet means therefor of each of said vessels to the inlet means for the supply of particulate solid of the other of said vessels.

References Cited by the Examiner

UNITED STATES PATENTS

| | | | |
|---|---|---|---|
| 1,474,062 | 11/1923 | Bellmann | 23—270 |
| 1,620,431 | 3/1927 | Bramwell | 210—189 X |
| 2,605,904 | 8/1952 | Ogilvie | 210—132 |
| 2,742,381 | 4/1956 | Weiss et al. | 210—19 X |
| 2,810,693 | 10/1957 | Wisfeld et al. | 210—268 X |
| 3,152,072 | 10/1964 | Yomiyama et al. | 210—189 X |
| 3,192,126 | 6/1965 | Fear | 210—136 X |

SAMIH N. ZAHARNA, *Primary Examiner.*

REUBEN FRIEDMAN, *Examiner.*

F. SPEAR, *Assistant Examiner.*